(12) United States Patent
Adams

(10) Patent No.: US 7,896,427 B2
(45) Date of Patent: Mar. 1, 2011

(54) TRAILER SIDE RAIL

(75) Inventor: James H. Adams, Jasper, AL (US)

(73) Assignee: Fontaine Trailer Company, Jasper, AL (US)

( * ) Notice: Subject to any disclaimer, the term of this patent is extended or adjusted under 35 U.S.C. 154(b) by 0 days.

(21) Appl. No.: 12/502,816

(22) Filed: Jul. 14, 2009

(65) Prior Publication Data

US 2009/0273204 A1 Nov. 5, 2009

Related U.S. Application Data

(63) Continuation of application No. 11/649,579, filed on Jan. 4, 2007, now Pat. No. 7,568,754.

(51) Int. Cl.
B62D 25/20 (2006.01)
(52) U.S. Cl. ..................................... 296/184.1
(58) Field of Classification Search ............... 296/184.1, 296/186.1, 36, 43; 114/219, 361; 293/126, 293/128
See application file for complete search history.

(56) References Cited

U.S. PATENT DOCUMENTS

| 3,125,354 | A | * | 3/1964 | Connerat | 280/422 |
|---|---|---|---|---|---|
| 3,252,730 | A | * | 5/1966 | Chieger et al. | 296/186.5 |
| 3,266,837 | A | * | 8/1966 | Stricker, Jr. et al. | 296/186.5 |
| 3,620,505 | A | * | 11/1971 | Murdock | 256/70 |
| 3,623,642 | A | * | 11/1971 | Stephen | 224/325 |
| 3,794,375 | A | * | 2/1974 | Woodward | 296/36 |
| 4,067,601 | A | * | 1/1978 | Tuerk | 296/36 |
| 4,416,484 | A | * | 11/1983 | O'Neill | 296/43 |
| 4,789,197 | A | * | 12/1988 | Lewis | 296/100.04 |
| 5,224,321 | A | * | 7/1993 | Fearn | 52/741.15 |
| 5,320,396 | A | * | 6/1994 | Petelka | 296/43 |
| 5,338,084 | A | * | 8/1994 | Wardell | 296/105 |
| 5,415,505 | A | * | 5/1995 | Halpin et al. | 410/9 |
| 5,476,348 | A | * | 12/1995 | Shelleby | 410/49 |
| 5,526,622 | A | * | 6/1996 | Augustine | 52/309.9 |
| 5,628,596 | A | * | 5/1997 | Halpin et al. | 410/29 |
| 5,890,757 | A | * | 4/1999 | Masterson et al. | 296/100.02 |
| 6,513,297 | B2 | * | 2/2003 | Kloepfer | 52/588.1 |
| 6,527,487 | B2 | * | 3/2003 | Adams | 410/104 |
| 6,871,904 | B2 | * | 3/2005 | Bhat et al. | 296/183.1 |
| 7,267,393 | B2 | * | 9/2007 | Booher | 296/182.1 |
| 7,401,844 | B2 | * | 7/2008 | Lemmons | 296/186.1 |
| 7,458,758 | B2 | * | 12/2008 | Adams | 410/104 |
| 7,735,891 | B2 | * | 6/2010 | Goode | 296/29 |
| 2007/0007759 | A1 | * | 1/2007 | Lemmons | 280/789 |
| 2009/0028658 | A1 | * | 1/2009 | Adams | 410/104 |

* cited by examiner

Primary Examiner — Kiran B. Patel
(74) Attorney, Agent, or Firm — Angela Holt; Lanier Ford Shaver & Payne P.C.

(57) ABSTRACT

An improved side rail structure is used to form a portion of a flat bed trailer. The side rail structure is integrally formed as one piece. The side rail structure includes an outer side rail wall which is integrally formed as one piece with a rub rail. A flooring section may also be formed as one piece with the outer side rail wall. The one piece side rail structure may be formed of extruded metal.

10 Claims, 2 Drawing Sheets

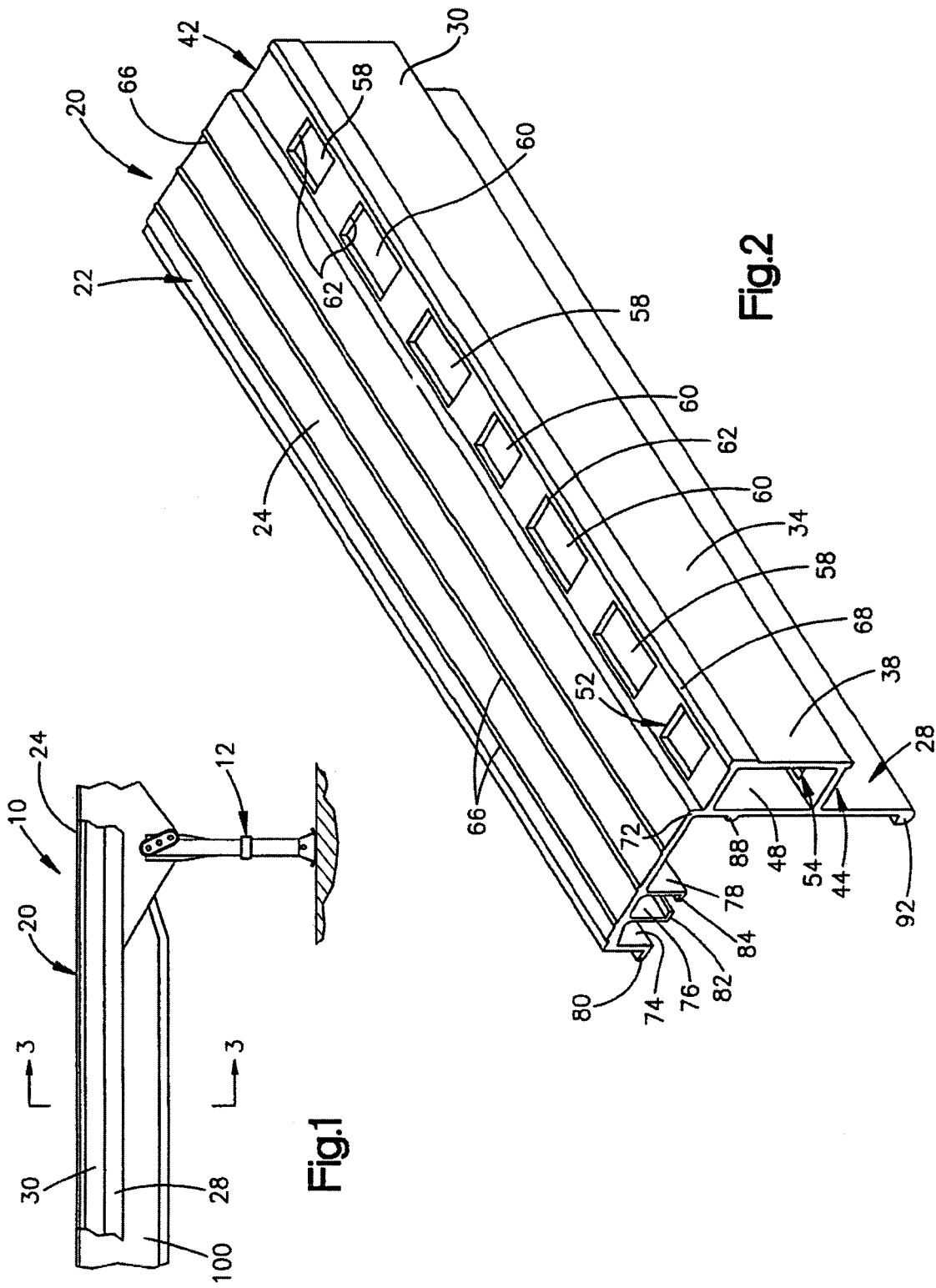

TRAILER SIDE RAIL

RELATED APPLICATIONS

This application is a continuation of and claims priority to U.S. Non-provisional application Ser. No. 11/649,579, filed Jan. 4, 2007, titled "Side Rail Structure," which is incorporated herein by reference.

FIELD OF THE INVENTION

The present invention is related to a trailer, and more specifically, to a side rail of a flatbed trailer.

BACKGROUND OF THE INVENTION

The present invention relates to a one piece, integrally formed, side rail structure for use in forming a portion of a flat bed trailer.

Loads of various types are transported by flat bed trailers. The flat bed trailers are designed to transport loads having many different sizes and configurations. In order to safely transport a load, the load must be secured against movement relative to the flat bed trailer.

Load securing systems have been developed to retain a load against movement relative to a flat bed trailer. Such load securing systems have included retaining straps, and/or chains which are connected to opposite sides of the trailer. In addition, stakes or posts have previously been utilized, either separately or in combination with retaining straps and/or chains, to secure a load on a flat bed trailer.

Retaining straps have been provided with ratchet type assemblies which are positioned along the length of the strap to tighten the strap onto the load. Alternatively, a winch assembly may be anchored to one side of the flat bed trailer and connected to a strap to tension the strap. Over center buckles have also been utilized to tension straps. Known flat bed trailers are disclosed in U.S. Pat. No. 6,527,487 and in U.S. Published Patent Application No. 2002/0025237.

SUMMARY OF THE INVENTION

An improved side rail structure for use in a flat bed trailer integrally formed as one piece. The side rail structure includes an outer side rail wall and a rub rail which is integrally formed as one piece with the outer side rail wall. The rub rail may include an outer side wall which extends along and is spaced from the outer side rail wall.

Upper and lower connector walls may be provided to connect the outer side wall of the rub rail to the outer side rail wall. Holes may be formed in the connector walls to facilitate connection of straps, chains and/or stakes with the flat bed trailer. If desired, the one piece, integrally formed, side rail structure may include a floor section. The one piece, integrally formed side rail structure may be formed of extruded metal.

The one piece side rail structure includes features which may be utilized together as disclosed herein or may be utilized separately. For example, the side rail structure may advantageously include a floor section which is integrally formed as one piece with the side rail wall and with the rub rail. However, the floor section may, if desired, be formed separately from the side rail wall and the rub rail. It should be understood that many different prior art features may be utilized in association with the one piece, integrally formed, side rail structure.

BRIEF DESCRIPTION OF THE DRAWINGS

The foregoing and other features of the invention will become more apparent upon a consideration of the following description taken in connection with the accompanying drawings wherein:

FIG. 1 is a schematic side elevational view of a flat bed trailer;

FIG. 2 is an enlarged schematic pictorial illustration of a one piece, integrally formed, side rail structure used in the flat bed trailer of FIG. 1;

DETAILED DESCRIPTION OF THE INVENTION

Figure 3:
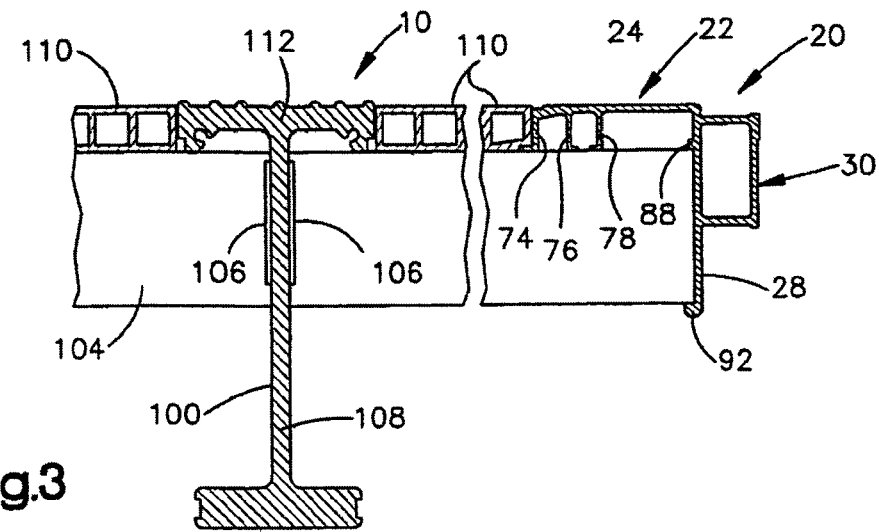
FIG. 3 is an enlarged schematic fragmentary sectional view, taken generally along the line 3-3 of FIG. 1, illustrating the manner in which the one piece, integrally formed, side rail structure is used to form a portion of the flat bed trailer.

A flat bed trailer 10 (FIG. 1) has a generally known construction and is utilized to carry many different types of loads. A rear portion (not shown) of the flat bed trailer is supported in a known manner by wheels which are connected with either a single axle or tandem axles. A retractable double leg support 12 is provided at a front end portion of a flat bed trailer 10 to support the front end portion of the flat bed trailer when the trailer is parked. The general construction of the flat bed trailer 10 is similar to the construction disclosed in U.S. Pat. Nos. 4,226,465 and 6,527,487.

In accordance with one of the features of the present invention, a longitudinally extending side rail structure 20 (FIG. 2) is utilized in the construction of the flat bed trailer 10. The side rail structure 20 is integrally formed as one piece of metal (aluminum). Although the side rail structure 20 may be formed in many different ways, the side rail structure 20 may advantageously be extruded as a single piece of metal.

The side rail structure 20 includes a floor section 22. The floor section 22 partially forms an upper side surface 24 (FIGS. 1 and 2) of the flat bed trailer 10. During use of the trailer 10, a load is positioned on the upper side surface 24 of the flat bed trailer.

An outer side rail wall 28 (FIG. 2) extends downward from the floor section 22. The outer side rail wall 28 extends along the entire length of the flat bed trailer 10. The floor section 22 is coextensive with the outer side rail wall 28. The outer side rail wall 28 extends perpendicular to the floor section 22.

A rub rail 30 projects outward from the outer side rail wall 28 and is coextensive with the outer side rail wall. The rub rail 30 protects the outer side rail wall 28 from engagement with objects in the environment around the flat bed trailer 10. The floor section 22, outer side rail wall 28 and rub rail 30 are integrally formed as one piece. The specific side rail structure 20 illustrated in FIG. 2 was extruded as a single piece of metal.

The rail rub 30 includes an outer rub rail wall 34 which extends along the outer side rail wall 28. The outer rub rail wall 34 of the rub rail 30 extends parallel to the outer side rail wall 28. However, the outer rub rail wall 34 of the rub rail 30 may be skewed relative to the outer side rail wall 28. Although the outer rub rail wall 34 of the rub rail 30 has a generally flat outer side surface 38, the outer rub rail wall 34 may be formed with a different configuration if desired. For example, the outer rub rail wall 34 may have an arcuate side surface which bulges outwardly in a direction away from the outer side rail wall 28.

The outer rub rail wall 34 (FIG. 2) of the rub rail 30 is connected to the outer side rail wall 28 by an upper connector wall 42 and a lower connector wall 44. The upper and lower connector walls 42 and 44 extend parallel to each other and perpendicular to the outer side rail wall 28 and perpendicular to the outer rub rail wall 34 of the rub rail 30. This results in a generally rectangular channel or passage 48 being formed by the rub rail 30 and outer side rail wall 28. However, the upper and the lower connector walls 42 and 44 may be skewed relative to each other and/or to the outer side rail wall 28 so that the channel 48 has a configuration other than the illustrated rectangular configuration.

An upper series 52 of openings is formed in the upper connector wall 42. Similarly, a lower series 54 of openings is formed in the lower connector wall 44. The openings in the upper series 52 of openings are aligned with correspondingly configured openings in the lower series 54 of the openings. The upper series 52 of openings include a plurality of spaced apart relatively small rectangular openings 58 and a plurality of relatively large generally rectangular openings 60 having end surfaces 62. If desired, the end surfaces 62 may have an arcuate configuration.

The lower series 54 of openings includes a plurality of relatively small rectangular openings which are aligned with and have the same size and configuration as the openings 58 in the upper series 52 of openings. The lower series 54 of openings also includes a plurality of relatively large openings which are aligned with and have the same size and configuration as the openings 60 in the upper series 52 of openings. The openings 58 and 60 are cut in the connector walls 42 and 44 after formation (extrusion) of the side rail structure 20.

Although the openings 58 and 60 have been illustrated as having the same rectangular configuration, the openings 58 and 60 may have different configurations if desired. For example, the openings 58 and/or 60 may have a circular configuration. Alternatively, the openings 58 and/or 60 may have a triangular configuration.

The floor section 22 (FIG. 2) has a generally flat upper side surface 24 with upwardly extending ribs 66. The ribs 66 extend parallel to a longitudinal central axis of the side rail structure 20 and to the outer side rail wall 28. The ribs 66 provide projections which retard sliding of the load in a direction transverse to the longitudinal central axes of the ribs.

The flat upper side surface 24 of the floor section 22 is disposed in a plane which extends across and is tangential to an arcuate upper side surface 68 on the outer rub rail wall 34 of the rub rail 30. The upper connector wall 42 is disposed below the plane of the upper side surface 24 of the floor section 22 and below the upper side surface 68 on the outer rub rail wall 34 of the rub rail 30. A corner 72 formed at the intersection of the floor section 22 and outer side rail 28 is disposed above and extends parallel to the upper connector wall 42 of the rub rail 30. The corner 72 extends parallel to the ribs 66 and the upper side surface 68 of the outer rub rail wall 34 of the rub rail 30.

Mounting webs 74, 76, and 78 extend downward from the floor section 22 and extend parallel to the outer side rail wall 28. Flanges 80, 82 and 84 are formed on the lower (as viewed in FIG. 2) end portions of the webs 74, 76, and 78. The flanges 80, 82, and 84 extend throughout the length of the side rail structure 20 and extend parallel to the floor section 22.

In addition, a mounting rib 88 extends inwardly, that is toward the left as viewed in FIG. 2, from the outer side rail wall 28. The mounting rib 88 has a lower side surface which is disposed in a coplanar relationship with lower side surfaces of the flanges 80, 82 and 84 on the mounting webs 74, 76, and 78. In addition, a mounting rib 92 extends inward, that is toward the left as viewed in FIG. 2, from the inner side of the outer side rail wall 28. The mounting rib 92 extends parallel to the mounting rib 88 and the flanges 80, 82 and 84 on the mounting webs, 74, 76 and 78.

In addition to the side rail structure 20, the flat bed trailer 10 includes a plurality of longitudinally extending I-beams 100 (FIG. 3). Although only one I-beam 100 is shown in FIG. 3, it should be understood that the flat bed trailer 10 includes a plurality of parallel I-beams. A transversely extending tubular frame member 104 extends perpendicular to the I-beams 100 and extends through openings formed in the I-beams. Although only one frame member 104 is shown in FIG. 3, it should be understood that the flat bed trailer 10 includes a plurality of parallel frame members which extends perpendicular to the I-beams 100. Welds 106 connect webs 108 of the I-beams 100 to frame members 104.

Longitudinally extending hollow floor sections 110 are positioned longitudinally of the flat bed trailer 10 in abutting parallel relationship with flanges 112 on the upper end portions of the I-beams 100. The floor sections 110 cooperate with the flanges 112 on the I-beams 100 to form the floor or deck of the flat bed trailer 10. The floor sections 110 are each welded to the frame member 104. The manner in which the floor sections 110 cooperate with the frame members 104 and I-beams 100 is the same as is disclosed in the aforementioned U.S. Patent Publication No. 2002/0025237.

As initially extruded, the side rail structure 20 has a length which is greater than the desired length of the flat bed trailer 10. The initial extrusion is cut to form the side rail structure 20 with a length which is the same as the desired length of the flat bed trailer 10. The openings 58 and 60 (FIG. 2) are then formed in the rub rail 30. The openings may be cut into the upper and lower connector walls 42 and 44 with a router. Of course, the openings 58 and 60 may be formed in a different manner if desired.

The side rail structure 20 is connected to the frame member 104 (FIG. 3) at welds between the mounting flanges 80, 82 and 84 (FIG. 2) on the mounting webs 74, 76, and 78 and the frame member. In addition, the side rail structure 20 is connected to the frame member 104 at a weld between the mounting ribs 88 and 92 (FIG. 2) and the frame member 104 (FIG. 3). The side rail structure 20 extends for the entire length of the flat bed trailer 10 and is welded to each of the frame members 104 which are disposed in the flat bed trailer. Although only a single side rail structure 20 is illustrated in FIGS. 1-3, there is a second side rail structure 20 disposed along the opposite longitudinally extending side of the flat bed trailer 10. The two identical, parallel side rail structures 20 are welded to the frame members 104 in the same manner as described in conjunction with the side rail structure 20 of FIG. 3.

Figure 4:
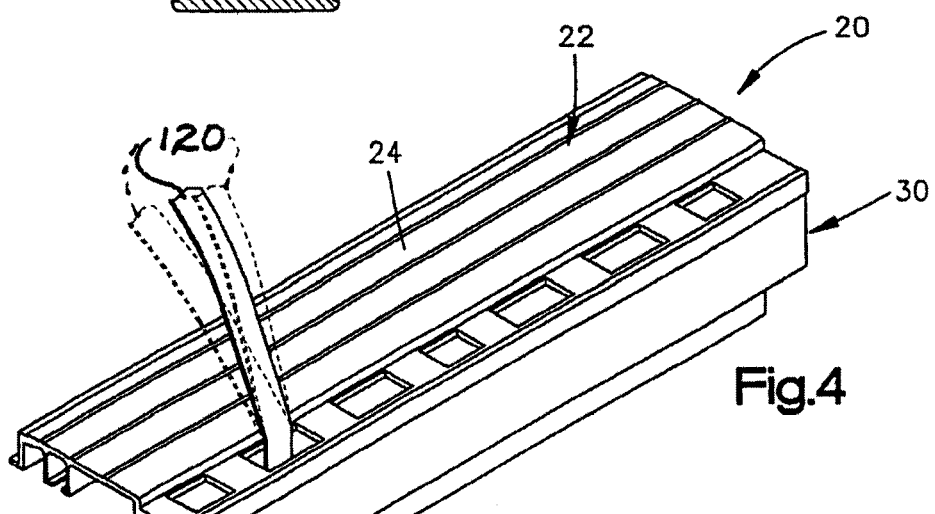
FIG. 4 is a schematic pictorial illustration, generally similar to FIG. 2 but on a reduced scale, illustrating the manner in which a strap for securing a load is used with the side rail structure.

It is contemplated that a plurality of straps or belts 120 (FIG. 4) may be used to secure a load to the flat bed trailer 10. The straps 120 may extend through openings 58 and/or 60 in the upper and lower connector walls 42 and 44 of the rub rail 30 and have hooks which engage the outer rub rail wall 34 and/or the lower connector wall 44 of the rub rail. Alternatively, the straps may be secured to the flat bed trailer utilizing winches which are mounted on an I-beam 100 disposed adjacent to the side rail structure 20. Of course, rather than utilizing straps to secure the load to the flat bed trailer 10, a chain having hooks may be utilized.

Figure 5:
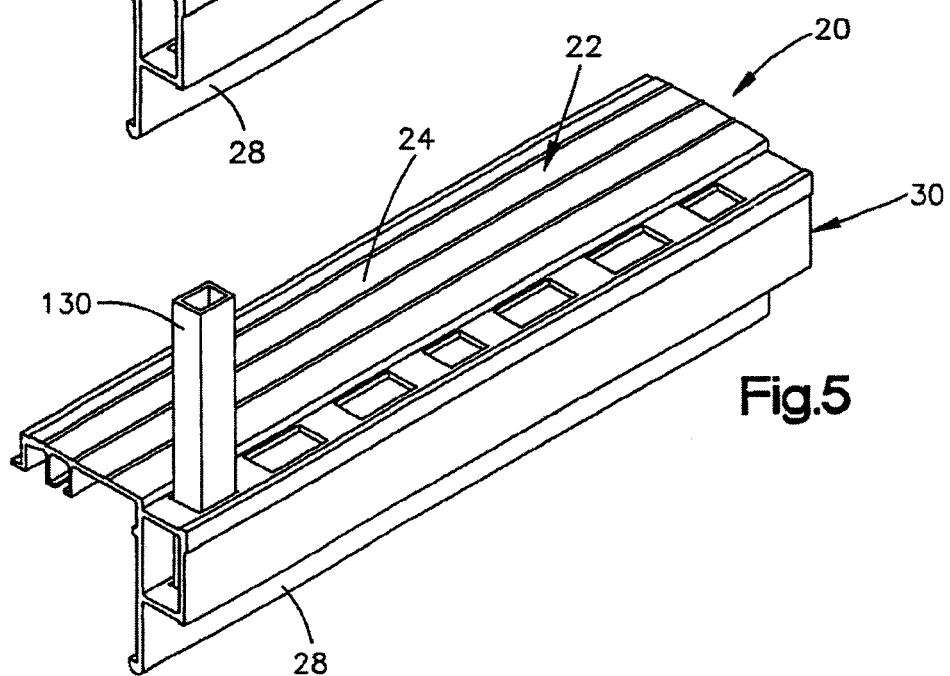
FIG. 5 is a schematic pictorial illustration, similar to FIG. 2 but on a reduced scale, illustrating the manner in which a post or stake is used with the side rail structure.

In place of or in addition to straps or chains to secure the load, posts 130 (FIG. 5) may be inserted through aligned of openings in the upper and lower connector walls 42 and 44 of the side rail structure 20. The posts 130 (FIG. 5) may extend through the relatively small rectangular opening 58 (FIG. 2) in the upper connector wall 42 of the rub rail 30 and through the aligned relatively small opening in the lower connector wall 44. It is contemplated that a combination of straps and/or chains and posts may be utilized to secure a load on a flat bed trailer 10.

In view of the foregoing description, it is apparent that the present invention provides a side rail structure 20 for use in a flat bed trailer 10. The side rail structure 20 is integrally formed as one piece. The side rail structure 20 includes an outer side rail wall 28 and a rub rail 30 which is integrally formed as one piece with the outer side rail wall. The rub rail 30 may include an outer rub rail wall 34 which extends along and is spaced from the outer side rail wall 28.

Upper and lower connector walls 42 and 44 may be provided to connect the outer rub rail wall 34 of the rub rail 30 to the outer side rail wall 28. Holes 58 and/or 60 may be formed in the connector walls 42 and 44 to facilitate connection of straps 120, chains and/or stakes 130 with the flat bed trailer 10. If desired, the one piece, integrally formed, side rail structures 20 may include a floor section 22. The one piece, integrally formed side rail structure 20 may be formed of extruded metal.

The one piece side rail structure 20 includes features which may be utilized together as disclosed herein or may be utilized separately. For example, the side rail structure 20 may advantageously include a floor section 22 which is integrally formed as one piece with the outer side rail wall 28 and with the rub rail 30. However, the floor section 22 may, if desired, be formed separately from the outer side rail wall 28 and the rub rail 30. It should be understood that many different prior art features may be utilized in association with the one piece, integrally formed, side rail structure 20.

What is claimed is:

1. A side rail structure for use in forming a portion of a flat bed trailer, said structure comprising:
   a floor section,
   an outer side rail wall integrally formed as one piece with the floor section and rigidly affixed to an outer edge of the floor section trailer, and
   a tubular rub rail which is integrally formed as one piece with said outer side rail wall, wherein the rub rail is comprised of a seamless tube with a substantially rectangular cross section comprising a substantially horizontal upper connector wall, a substantially vertical outer side wall, and a substantially horizontal lower connector wall, wherein the upper connector wall and the lower connector wall are coextensive with and substantially perpendicular to an outer rub rail wall.

2. The side rail structure of claim 1, wherein the upper connector wall is disposed below a plane of an upper side surface of the floor section, forming a corner at the intersection of the floor section and the outer side rail wall.

3. The side rail structure of claim 1, wherein the rub rail further comprises an upper series of openings formed in the upper connector wall.

4. The side rail structure of claim 3, wherein the rub rail further comprises a lower series of openings formed in the lower connector wall.

5. The side rail structure of claim 4, wherein the upper series of openings comprises a plurality of substantially rectangular openings and the lower series of openings comprises a plurality of substantially rectangular openings aligned with the upper series of openings.

6. The side rail structure of claim 5, further comprising a securement strap which passes through at least one opening of the upper series of openings and at least one opening of the lower series of openings to secure a load.

7. The side rail structure of claim 5, wherein the pluralities of substantially rectangular openings have arcuate ends.

8. The side rail structure of claim 5, further comprising at least one securement stake received by at least one of the openings in the upper series of openings.

9. The side rail structure of claim 2, further comprising at least one mounting flange protruding downwardly from a lower surface of the floor section for contacting with a frame member of the trailer.

10. The side rail structure of claim 1, wherein the tubular side rail is affixed to a frame member of the trailer with a plurality of fasteners.

\* \* \* \* \*